(12) United States Patent
Kato

(10) Patent No.: US 9,299,338 B2
(45) Date of Patent: Mar. 29, 2016

(54) FEATURE SEQUENCE GENERATING DEVICE, FEATURE SEQUENCE GENERATING METHOD, AND FEATURE SEQUENCE GENERATING PROGRAM

(75) Inventor: Masanori Kato, Tokyo (JP)

(73) Assignee: NEC CORPORATION, Tokyo (JP)

(*) Notice: Subject to any disclaimer, the term of this patent is extended or adjusted under 35 U.S.C. 154(b) by 241 days.

(21) Appl. No.: 13/880,630

(22) PCT Filed: Oct. 28, 2011

(86) PCT No.: PCT/JP2011/006032
§ 371 (c)(1),
(2), (4) Date: Apr. 19, 2013

(87) PCT Pub. No.: WO2012/063424
PCT Pub. Date: May 18, 2012

(65) Prior Publication Data
US 2013/0211839 A1    Aug. 15, 2013

(30) Foreign Application Priority Data

Nov. 8, 2010  (JP) .................................. 2010-249604

(51) Int. Cl.
*G10L 15/12* (2006.01)
*G10L 13/08* (2013.01)
(Continued)

(52) U.S. Cl.
CPC ............... *G10L 13/08* (2013.01); *G10L 13/033* (2013.01); *G10L 15/04* (2013.01); *G10L 15/10* (2013.01); *G10L 13/0335* (2013.01)

(58) Field of Classification Search
CPC ....... G10L 15/04; G10L 15/10; G10L 15/285; G10L 15/14

USPC ......... 704/241, 239, 262, 238, 252, 253, 255, 704/250, 257
See application file for complete search history.

(56) References Cited

U.S. PATENT DOCUMENTS 5,230,037 A * 7/1993 Giustiniani et al. .......... 704/200
5,369,727 A * 11/1994 Nomura et al. ............... 704/252
(Continued)

FOREIGN PATENT DOCUMENTS

| JP | 2003-271185 A | 9/2003 |
|---|---|---|
| JP | 2004-012584 A | 1/2004 |

(Continued)

OTHER PUBLICATIONS

Takashi Masuko, et al., "HMM-Based Speech Synthesis Using Dynamic Features", IEICE (the Institute of Electronics, Information and Communication Engineers) Trans., D-II, vol. J79-D-II, No. 12, Dec. 1996, pp. 2124-2190. Concise English language explanation provided in Applicant's specification beginning at paragraph [0004].

(Continued)

*Primary Examiner* — Vijay B Chawan

(57) ABSTRACT

Spread level parameter correcting means 501 receives a contour parameter as information representing the contour of a feature sequence (a sequence of features of a signal considered as the object of generation) and a spread level parameter as information representing the level of a spread of the distribution of the features in the feature sequence. The spread level parameter correcting means 501 corrects the spread level parameter based on a variation of the contour parameter represented by a sequence of the contour parameters. Feature sequence generating means 502 generates the feature sequence based on the contour parameters and the corrected spread level parameters.

18 Claims, 6 Drawing Sheets

(51) Int. Cl.
*G10L 15/04* (2013.01)
*G10L 15/10* (2006.01)
*G10L 13/033* (2013.01)

(56) References Cited

U.S. PATENT DOCUMENTS 5,819,219 A * 10/1998 De Vos et al. .............. 704/238
5,822,729 A * 10/1998 Glass ........................ 704/255

FOREIGN PATENT DOCUMENTS

JP 2007-011203 A 1/2007
JP 2007-279349 A 10/2007

OTHER PUBLICATIONS

Keiichi Tokuda, "Fundamentals of Speech Synthesis Based on HMM", IEICE Technical Report, vol. 100, No. 392, Oct. 2000, pp. 43-50. Concise English language explanation provided in Applicant's specification beginning at paragraph [0004].

H. Zen, et al., "A Hidden Semi-Markov Model-Based Speech Synthesis System", IEICE Trans. Inf. & Syst., vol. E90-D, No. 5, May 2007, pp. 825-834, English Publication. Concise English language explanation provided in Applicant's specification beginning at paragraph [0004].

International Search Report of PCT Application No. PCT/JP2011/006032 mailed on Jan. 31, 2012.

* cited by examiner

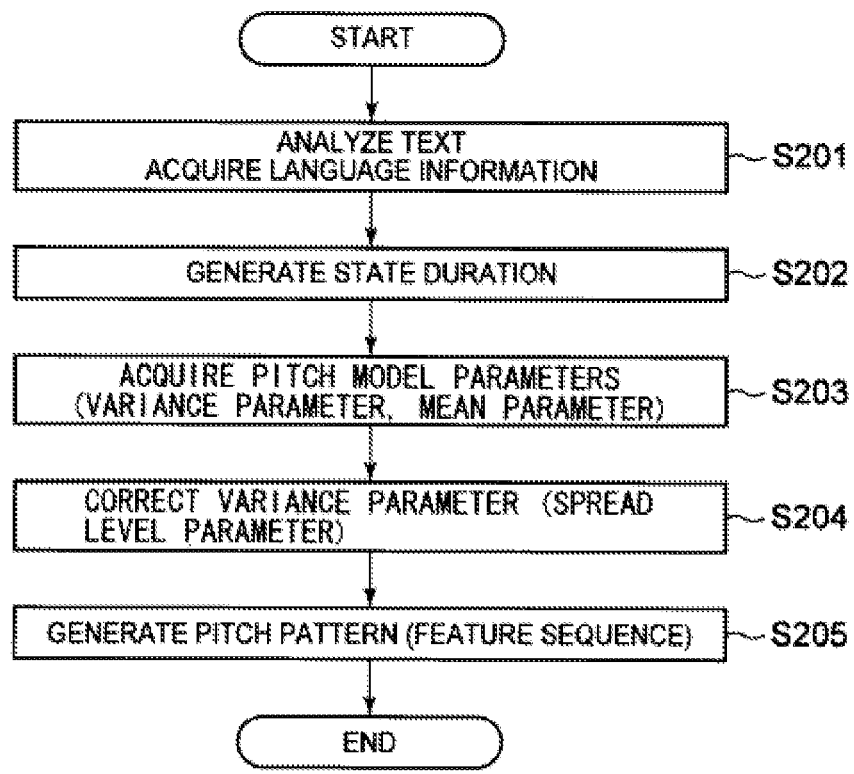

| CONTEXT | MODEL PARAMETER |
|---------|-----------------|
| C1 | M1 |
| C2 | M2 |
| C3 | M3 |
| ... | ... |

FEATURE SEQUENCE GENERATING DEVICE, FEATURE SEQUENCE GENERATING METHOD, AND FEATURE SEQUENCE GENERATING PROGRAM

This application is a National Stage Entry of PCT/JP2011/006032 filed Oct. 28, 2011, which claims priority from Japanese Patent Application 2010-249604 filed Nov. 8, 2010, the contents of all of which are incorporated herein by reference, in their entirety.

TECHNICAL FIELD

The present invention relates to a feature sequence generating device, a feature sequence generating method, and a feature sequence generating program for generating a feature sequence as a sequence of features of a signal.

BACKGROUND ART

Recently, attention is paid to a technology for generating a sequence of features of a signal and then generating the signal based on the sequence of features generated. Such a technology is used to generate a signal (speech signal, music signal, acoustic signal, image signal, video signal, etc.). The signal includes ordinal elements such as time series elements and coordinate series elements. Adjacent ordinal elements have a certain relationship (e.g., continuity) between them.

For example, in the field of speech synthesis for analyzing text and generating synthetic speech (synthetic voice) based on phonetical information represented by the text, the speech is synthesized by generating features (pitch frequencies (heights of voice), phonemic durations (lengths of sound), spectrums, cepstrums, etc.) in a time line by use of the HMM (Hidden Markov Model) widely spread in the field of speech recognition. Also in the field of music synthesis, a music signal is generated similarly by generating features (fundamental frequencies, durations, spectrums, etc. of the music signal) in a time line by use of the HMM. Further, also in the field of image synthesis, an image is generated by generating a sequence of features of DCT (Discrete Cosine Transform) coefficients based on statistics extracted from a large number of images.

Methods usable in the field of speech synthesis for generating a feature sequence have been described, for example, in Non-patent Literatures 1-3. The methods of the Non-patent Literatures 1-3 previously store mean parameters and variance parameters of the HMM. Upon execution of the speech synthesis, the feature sequence is generated by acquiring a mean parameter and a variance parameter for each state in the HMM based on the result of text analysis.

For example, Patent Literature 1 describes that a data output device for outputting time-line data calculates data for times (time points) at prescribed intervals (outputted by a state transition probability model) based on estimated state probabilities and typical data outputted by states and outputs the calculated data as the time-line data. The Patent Literature 1 also describes that the property of a vector time series (sequence) can be changed by adjusting the variance parameter of the transition probability.

CITATION LIST

Patent Literature

Patent Document 1 JP-2007-11203-A (paragraphs [0192] to [0194])

Non-Patent Literature

Non-patent Literature 1 Takashi Masuko, et al., "HMM-Based Speech Synthesis Using Dynamic Features", IEICE (the Institute of Electronics, Information and Communication Engineers) Trans., D-II, Vol. J79-D-II, No. 12 (December 1996), Pages 2128 to 2190

Non-patent Literature 2 Keiichi Tokuda, "Fundamentals of Speech Synthesis Based on HMM", IEICE Technical Report, Vol. 100, No. 392 (October 2000), Pages 43 to 50

Non-patent Literature 3 H. Zen, et al., "A Hidden Semi-Markov Model-Based Speech Synthesis System", IEICE Trans. INF. & SYST., Vol. E90-D, No. 5 (2007), Pages 825 to 834

SUMMARY OF INVENTION

Technical Problem

However, the methods described in the Non-patent Literatures 1 to 3 involve the following problem. When the mean parameters are arranged in a time line, discontinuity occurs in the feature sequence if the variance parameter is small at a part where a variation of the mean parameter in the direction of the time line is great. Due to the discontinuity, the quality of the signal generated is deteriorated substantially.

The discontinuity of the features at the part where the variation in the mean parameter is great can be eliminated if the value of the variance parameter is modified to a remarkably great value, for example. However, increasing the variance parameter remarkably leads to considerable irregularity in the overall shape of the feature sequence. Thus, in order to eliminate the discontinuity of the features without causing the irregularity in the overall shape of the feature sequence, the variance parameter is required to be corrected in an appropriate manner.

Incidentally, while the Patent Literature 1 has described that the property of a vector time series (sequence) can be changed by adjusting the variance parameter of the transition probability, no concrete methods (what to focus on, how to make the adjustment, etc.) have been disclosed.

It is therefore the primary object of the present invention to provide a feature sequence generating device, a feature sequence generating method and a feature sequence generating program capable of generating a feature sequence that changes smoothly by eliminating the discontinuity of the features without disturbing the overall shape of the feature sequence.

Solution to Problem

A feature sequence generating device comprising: spread level parameter correcting means which receives a contour parameter which represents the contour of a feature sequence of a signal and a spread level parameter which represents the level of a spread of the distribution of the features in the feature sequence, and corrects the spread level parameter based on a variation of the contour parameter represented by a sequence of the contour parameters; and feature sequence generating means which generates the feature sequence based on the contour parameters and the spread level parameters corrected by the spread level parameter correcting means.

A feature sequence generating method in accordance with the present invention comprises: correcting a spread level parameter representing the level of a spread of the distribution of features in a feature sequence of a signal, based on the variation of a contour parameter, which represents a contour of the feature sequence, represented by a contour parameter sequence; and generating the feature sequence based on the contour parameters and the corrected spread level parameters.

A feature sequence generating program in accordance with the present invention causes a computer to execute: a process of correcting a spread level parameter representing the level of a spread of the distribution of features in a feature sequence of a signal, based on the variation of a contour parameter, which represents a contour of the feature sequence, represented by a contour parameter sequence; and a process of generating the feature sequence based on the contour parameters and the corrected spread level parameters.

Advantageous Effect of the Invention

According to the present invention, the spread level parameter is corrected depending on the variation of the contour parameter. Consequently, a feature sequence changing smoothly is generated without disturbing the overall shape of the feature sequence.

BRIEF DESCRIPTION OF DRAWINGS

FIG. 6 It depicts a flow chart showing an example of the operation of the second exemplary embodiment.

FIG. 7 It depicts an explanatory drawing showing an example of a table storing the correspondence between contexts and state durations.

DESCRIPTION OF EMBODIMENTS

First Exemplary Embodiment

Figure 1:
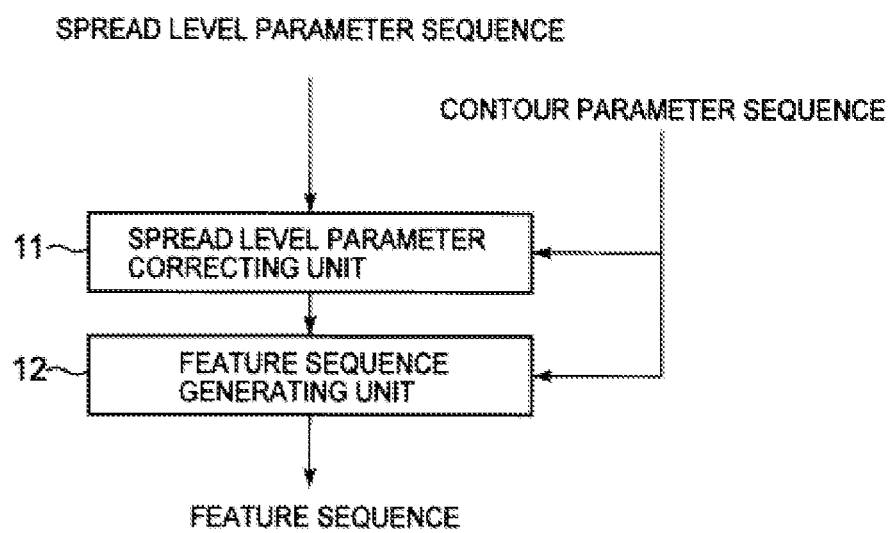
FIG. 1 It depicts a block diagram showing an example of the configuration of a feature sequence generating device in accordance with a first exemplary embodiment.

Referring now to the drawings, a description will be given in detail of exemplary embodiments in accordance with the present invention. FIG. 1 is a block diagram showing an example of the configuration of a feature sequence generating device in accordance with a first exemplary embodiment of the present invention. The feature sequence generating device shown in FIG. 1 comprises a spread level parameter correcting unit 11 and a feature sequence generating unit 12.

The spread level parameter correcting unit 11 receives a spread level parameter sequence and a contour parameter sequence, corrects the spread level parameter based on the spread level parameter sequence and the contour parameter sequence inputted thereto, and supplies (outputs) the corrected spread level parameter to the feature sequence generating unit 12.

The spread level parameter is a parameter that represents the level of a spread of the distribution of the features in the feature sequence of a signal considered as the object of generation. The spread level parameter sequence is a set of spread level parameters arranged along the time line of the feature sequence. The contour parameter is a parameter that represents the contour of the feature sequence (more specifically, the contour of a graph drawn by the feature sequence). The contour parameter sequence is a set of contour parameters arranged along the time line of the feature sequence.

The feature sequence generating unit 12 generates a feature sequence based on the contour parameter sequence inputted thereto and the spread level parameter sequence outputted from the spread level parameter correcting unit.

In this exemplary embodiment, the spread level parameter correcting unit 11 and the feature sequence generating unit 12 are implemented by, for example, an information processing device (e.g., CPU) operating according to a program. Incidentally, the processing units (spread level parameter correcting unit 11, feature sequence generating unit 12) may either be implemented by one unit or units separate from each other.

Figure 2:
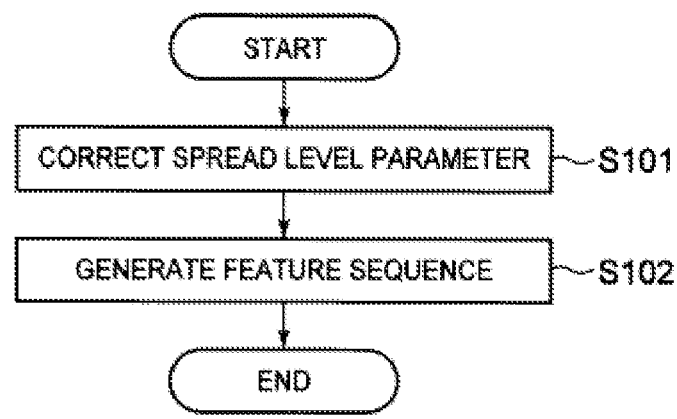
FIG. 2 It depicts a flow chart showing an example of the operation of the first exemplary embodiment.

Next, the operation of this exemplary embodiment will be described below. FIG. 2 is a flow chart showing an example of the operation of this exemplary embodiment. In the example of FIG. 2, first, the spread level parameter correcting unit 11 corrects each spread level parameter in cases where the spread level parameter should be corrected based on the inputted spread level parameter sequence and contour parameter sequence (step S101). Then, the spread level parameter correcting unit 11 outputs the corrected spread level parameter sequence to the feature sequence generating unit 12.

Basically, the spread level parameter correcting unit 11 calculates a variation of the contour parameter in the direction of the sequence. The spread level parameter correcting unit 11 further calculates a correction value of the spread level parameter (corresponding to the magnitude of the variation) at each sequence number where the variation is great. However, the spread level parameter correcting unit 11 does not make the correction when the value of the inputted spread level parameter is sufficiently large, that is, when the spread level parameter is large enough not to cause discontinuity in the feature sequence. Specifically, the spread level parameter correcting unit 11 calculates a provisional correction value of the spread level parameter based on the variation of the contour parameter in the direction of the sequence and determines the final value (value after the correction) by comparing the calculated provisional correction value with the value before the correction. The spread level parameter correcting unit 11 compares the provisional correction value with the value of the spread level parameter before the correction (original value of the spread level parameter). When the original spread level parameter is judged to be large enough not to cause discontinuity in the feature sequence based on the result of the comparison, the spread level parameter correcting unit 11 does not make the correction. In short, the spread level parameter correcting unit 11 determines the final output value by executing the calculation of the variation of the contour parameter, the calculation of the provisional correction value of the spread level parameter, and the comparison of the provisional correction value and the value before the correction.

The spread level parameter correcting unit 11 may use the difference, ratio, etc. between adjacent contour parameters (whose sequence numbers are adjacent to each other) as the variation of the contour parameter. Let "$\mu_j$" represent the contour parameter at the sequence number j, the amount $\delta_j$ of change at the sequence number j is calculated according to the following expression (1), for example:

$$\delta_j = \begin{cases} \dfrac{\mu_j}{\mu_{j+1}}, & \text{if } \mu_j > \mu_{j+1} \\ \dfrac{\mu_{j+1}}{\mu_j}, & \text{otherwise} \end{cases} \quad \text{Expression (1)}$$

In the expression (1), the ratio is used as the variation. With the increase in the variation, the value of $\delta_j$ also increases. Besides this method using the ratio as the variation, other methods using the absolute value of the difference, the square error, the absolute value of the logarithmic error, etc. as the variation are also effective. While the contour parameters at the sequence numbers j and j+1 are used for the calculation of the variation at the state j in the above expression (1), a similar effect can be achieved even if the contour parameters at the sequence numbers j and j−1 are used. Further, besides this method using adjacent sequence numbers, other methods using the contour parameters at multiple sequence numbers selected from future sequence numbers (j+1, j+2, j+3, . . . ) or past sequence numbers (j−1, j−2, j−3, . . . ) are also effective.

Incidentally, in cases where the contour parameter is a structure including a plurality of elements, for example, the variation may be calculated for each pair (or group) of corresponding elements at the adjacent contour parameters (whose sequence numbers are adjacent to each other).

Subsequently, based on the calculated the variation, the spread level parameter correcting unit 11 calculates the provisional correction value of the spread level parameter. The spread level parameter correcting unit 11 increases the provisional correction value with the increase in the variation. Thus, the spread level parameter correcting unit 11 generally calculates the provisional correction value by using a monotonically increasing function. Let "$\delta_j$" represent the variation at the sequence number j, the provisional correction value $\hat{\sigma}_j$ at the sequence number j is calculated according to the following expression (2) ($a_1, a_2, b_1, b_2, b_3$: real constants satisfying $0<a_1<a_2$ and $0<b_1<b_2<b_3$), for example:

$$\hat{\sigma}_j = \begin{cases} b_1, & \text{if } \delta_j < a_1 \\ b_2, & \text{if } a_1 \leq \delta_j < a_2 \\ b_3, & \text{if } a_2 \leq \delta_j \end{cases} \quad \text{Expression (2)}$$

A method using a linear function like the following expression (3) is also effective.

$$\hat{\sigma}_j = a \cdot \delta_j + b \quad \text{Expression (3)}$$

The values of the real constants to be used for the calculation of the provisional correction values are determined to suit each case of actual application, based on previous examination performed by using actual data, for example.

Finally, the spread level parameter correcting unit 11 compares the provisional correction value with the value of the spread level parameter before the correction. When the difference between the provisional correction value and the value of the spread level parameter before the correction is a prescribed threshold value of greater, the spread level parameter correcting unit 11 outputs the provisional correction value. When the difference is less than the prescribed threshold value, the spread level parameter correcting unit 11 outputs the value of the spread level parameter before the correction. In the following description, the spread level parameter outputted from the spread level parameter correcting unit 11 can be expressed as a "spread level parameter after the correction" irrespective of whether the correction was actually made or not.

Let "$\hat{\sigma}_j$" and "$\sigma_j$" represent the provisional correction value and the spread level parameter before the correction, respectively, the spread level parameter $\bar{\sigma}_j$ after the correction may be determined according to the following expression (4) ($\alpha_1$: positive real number):

$$\bar{\sigma}_j = \begin{cases} \hat{\sigma}_j, & \text{if } |\hat{\sigma}_j - \sigma_j| > \alpha_1 \\ \sigma_j, & \text{if } |\hat{\sigma}_j - \sigma_j| \leq \alpha_1 \end{cases} \quad \text{Expression (4)}$$

In this case where the expression (4) is used, the value of the inputted spread level parameter is judged to be sufficiently large (i.e., large enough not to cause discontinuity in the feature sequence) if the difference value between the provisional correction value and the value before the correction is less than the prescribed threshold value ($\alpha_1$).

Besides this method using the difference, a method determining the spread level parameter after the correction by evaluating a ratio based on the following expression (5) is also effective ($\alpha_2$: real number larger than 1.0):

$$\bar{\sigma}_j = \begin{cases} \hat{\sigma}_j, & \text{if } \dfrac{\hat{\sigma}_j}{\sigma_j} > \alpha_2 \\ \sigma_j, & \text{if } \dfrac{\hat{\sigma}_j}{\sigma_j} \leq \alpha_2 \end{cases} \quad \text{Expression (5)}$$

In this case where the expression (5) is used, the value of the inputted spread level parameter is judged to be sufficiently large (i.e., large enough not to cause discontinuity in the feature sequence) if the ratio of the provisional correction value to the value of the spread level parameter before the correction is less than the prescribed threshold value ($\alpha_2$).

Subsequently, the feature sequence generating unit 12 generates the feature sequence based on the contour parameter sequence inputted thereto and the spread level parameter sequence outputted from the spread level parameter correcting unit (step S102). The method of generating the feature sequence varies depending on the relationship among the feature sequence and the two types of parameters (contour parameter, spread level parameter). The following example shows a method for generating the feature sequence by means of smoothing (one of the most typical methods).

Figure 3:
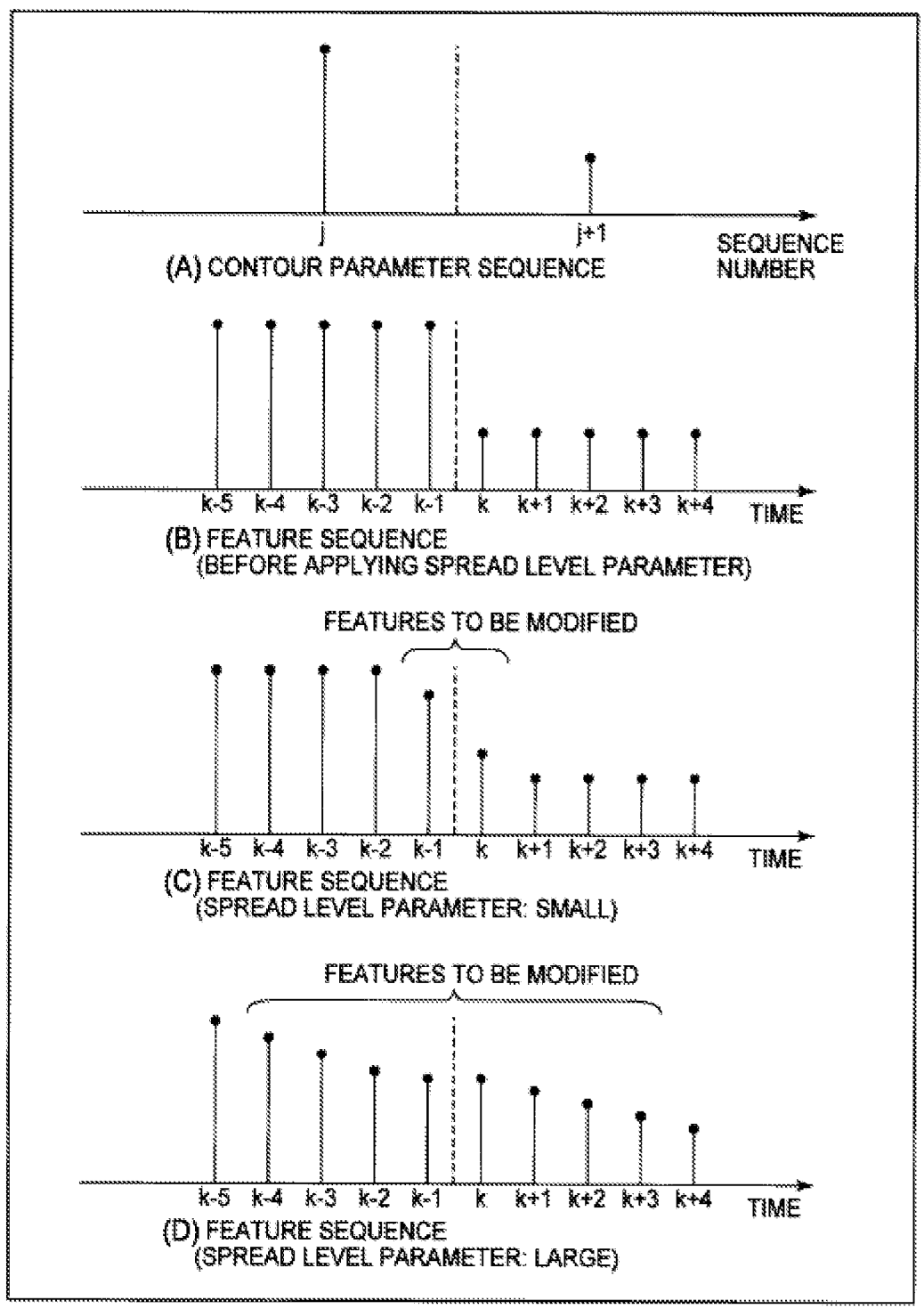
FIG. 3 It depicts an explanatory drawing schematically showing an example of the relationship among a contour parameter, a spread level parameter and a generated feature sequence.

FIG. 3 is an explanatory drawing schematically showing an example of the relationship among the contour parameter, the spread level parameter and the generated feature sequence. In FIG. 3, (A) shows an example of the contour parameter sequence and (B) shows an example of the feature sequence generated without considering the spread level parameter. In the example of (A) and (B), the contour parameter is a value representing five points in the feature sequence. Specifically, the contour parameter at the sequence number j is a value representing a feature sequence of features at time points k−5, k−4, k−3, k−2 and k−1. The contour parameter at the sequence number j+1 is a value representing a feature sequence of features at time points k, k+1, k+2, k+3 and k+4. Under such supposition, (C) and (D) show an example of generating the feature sequence by considering the spread level parameter. Specifically, (C) shows an example of the feature sequence that is generated when the spread level parameter is small, while (D) shows an example of the feature sequence that is generated when the spread level parameter is large.

In the example of FIG. 3(C), the spread level parameter is small, and thus the features to be modified are restricted to those at the time points k−1 and k and their values are like those acquired by linear interpolation from k−2 to k+1. In contrast, in the example of FIG. 3(D), the spread level parameter is large, and thus the features to be modified are those at the time points k−4 through k+3 and their values are like those acquired by linear interpolation from k−5 to k+4. In the examples shown in FIG. 3, the spread level parameter corresponds to the range where features are modified. Therefore, the range where features are modified changes according to the change in the magnitude of the spread level parameter. When the spread level parameter is small, the range where features are modified is narrow and thus the shape of the graph of the feature sequence changes sharply. When the spread level parameter is large, the range where features are modified is wide and thus the shape of the graph of the feature sequence changes gently.

As described above, the feature sequence generating device of this exemplary embodiment calculates the variation of the contour parameter in the sequence number direction. For sequence numbers at which the variation is great, the feature sequence generating device carries out the correction of the spread level parameter corresponding to the magnitude of the variation. Consequently, the discontinuity of the feature sequence at a region where the contour parameter changes greatly is reduced and a feature sequence changing smoothly and having less highly-discontinuous region can be generated.

Second Exemplary Embodiment

Figure 4:
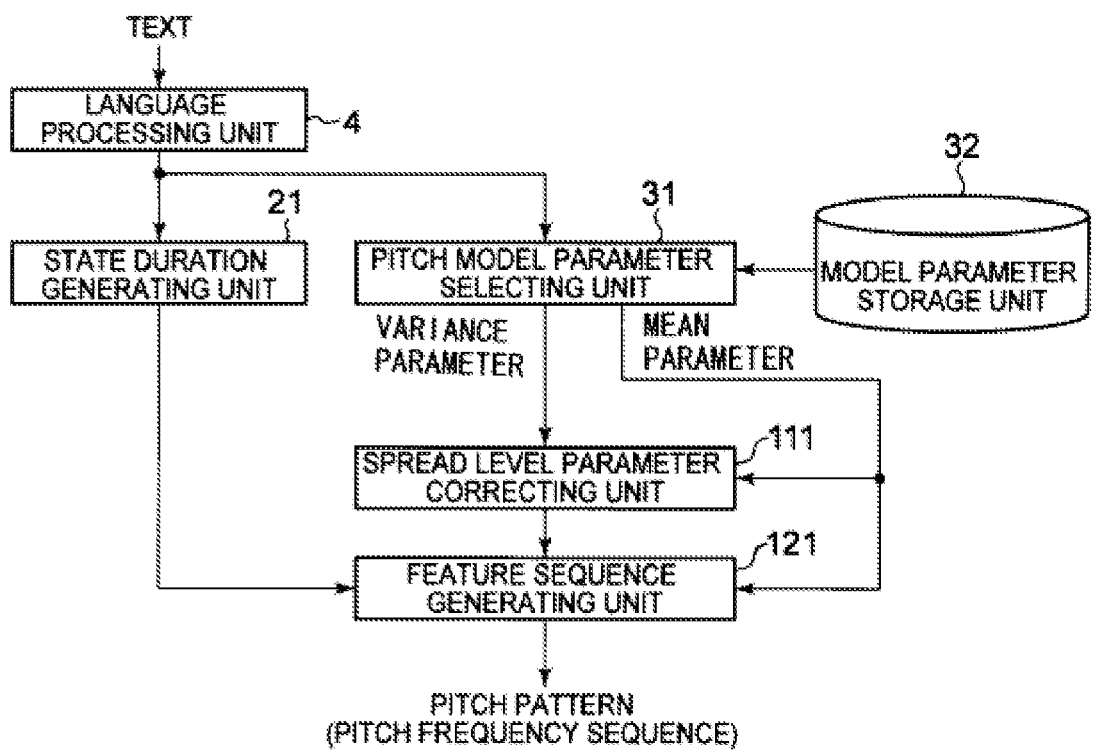
FIG. 4 It depicts a block diagram showing an example of the configuration of a feature sequence generating device in accordance with a second exemplary embodiment.

Next, a second exemplary embodiment of the present invention will be described below. FIG. 4 is a block diagram showing an example of the configuration of a feature sequence generating device in accordance with the second exemplary embodiment of the present invention. The feature sequence generating device shown in FIG. 4 further comprises a language processing unit 4, a state duration generating unit 21, a pitch model parameter selecting unit 31 and a model parameter storage unit 32 in addition to the first exemplary embodiment shown in FIG. 1. Further, the feature sequence generating device of FIG. 4 comprises a spread level parameter correcting unit 111 and a feature sequence generating unit 121 instead of the spread level parameter correcting unit 11 and the feature sequence generating unit 12.

The feature sequence generating device of this exemplary embodiment generates a pitch pattern (a sequence of pitch frequencies of speech) as the feature sequence.

The pitch model parameter storage unit 32 stores information on the pitch frequencies of speech (modeled by employing HMM) in a format of HMM parameters. In the following description, the HMM parameters regarding the pitch frequencies will be referred to as "pitch model parameters".

Figure 5:
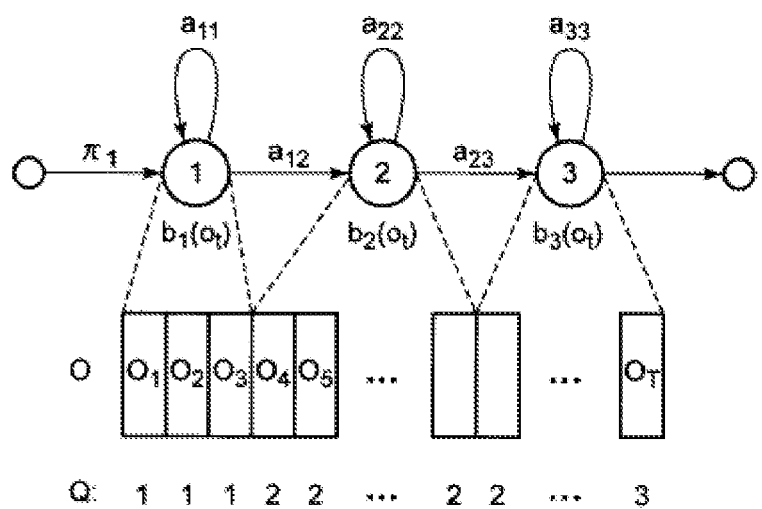
FIG. 5 It depicts an explanatory drawing showing an example of an HMM in which information on pitch frequencies of speech has been modeled.

FIG. 5 is an explanatory drawing showing an example of an HMM in which the information on the pitch frequencies of speech has been modeled. As shown in FIG. 5, the HMM in this exemplary embodiment is defined as a model in which signal sources (states), each having a probability distribution $b_j(o_t)$ of outputting an output vector $o_t$, are connected via state transition probabilities of $a_{ij}=P(q_t=j|q_{t-1}=i)$. The subscripts i and j represent state numbers. The output vector $o_t$ is a parameter representing a short-time spectrum of the speech (cepstrum, linear prediction coefficients, etc.), the pitch frequency of the speech, etc. In short, the HMM is information acquired by statistically modeling fluctuation in the time direction and the parameter direction. The HMM is generally known to be suitable for representing speech, fluctuating due to various factors, in terms of a parameter sequence.

According to the definitions in the HMM, the pitch model parameters correspond to parameters characterizing the output probability distribution. The output probability distribution in the HMM is defined by a Gaussian distribution in many cases. Since a Gaussian distribution is characterized by two types of statistics: mean and variance, the pitch model parameters will hereinafter be assumed concretely to be the mean and the variance of the Gaussian distribution. Besides the Gaussian distribution, any type of probability distribution may be used as long as the probability distribution is characterized by a mean and a variance.

The mean parameter included in the pitch model parameters is used in the speech synthesis as a value roughly characterizing the framework of the pitch pattern of the synthesized speech. Thus, the mean parameter can be regarded as an example of the "contour parameter" in the present invention. In this exemplary embodiment, a mean parameter representing the mean of the output probability distribution in the HMM is used as a concrete example of the contour parameter. Besides the mean parameter, other types of statistics such as a median, a mode, a maximum value and a minimum value can also be used.

The variance parameter included in the pitch model parameters is used in the speech synthesis as a value representing the spread level of the distribution of the pitch frequencies in the synthesized speech. Thus, the variance parameter can be regarded as an example of the "spread level parameter" in the present invention. For example, when the value of the variance parameter in a certain period is small, the pitch frequency in the period takes on values close to the mean parameter (contour parameter) and thus the pitch pattern is substantially in a linear shape. When the value of the variance parameter equals zero, the pitch frequency in the period constantly coincides with the value of the mean parameter and thus the pitch pattern is perfectly in a linear shape. In this exemplary embodiment, a variance parameter representing the variance of the output probability distribution in the HMM is used as a concrete example of the spread level parameter. However, statistics other than the variance may also be used. For example, the standard deviation can also be used as a spread level parameter other than the variance.

HMM parameters, not only the pitch model parameters, are determined by a learning process. The learning is performed by using speech data and phoneme labels and language information in regard to the speech data. The method for learning the HMM model parameters is a publicly known technique and thus explanation thereof is omitted.

The language processing unit 4 receives a text (character string information), executes analysis (morphological analysis, parsing, reading analysis, etc.) of the inputted text, thereby generates language information that includes at least information representing the "reading" (syllable symbols, phonemic symbols, etc.), and outputs the generated language information to the state duration generating unit 21 and the pitch model parameter selecting unit 31. The language information may include not only the information representing the reading but also any type of information on the speech represented by the text, such as information representing parts of speech of morphemes, conjugations, accent types, accent positions, accentual phrase segmentation, etc.

The state duration generating unit 21 generates state durations in the HMM based on the language information outputted from the language processing unit 4 and outputs the state durations to the feature sequence generating unit 121. The speech modeled by the HMM is assumed to have a plurality of "states" in each phoneme. The number of states is defined as the same value (same number) for all the phonemes. The state duration corresponds to the number of times (terms) of residence in each state belonging to a phoneme. Therefore, the duration of a phoneme corresponds to the sum of the durations of states belonging to the phoneme.

The pitch model parameter selecting unit 31 acquires optimum pitch model parameters from the pitch model parameter storage unit 32 based on the language information outputted from the language processing unit 4. Then, the pitch model parameter selecting unit 31 outputs the mean parameter included in the acquired pitch model parameters to the spread level parameter correcting unit 111 and the feature sequence generating unit 121. Further, the pitch model parameter selecting unit 31 outputs the variance parameter included in the acquired pitch model parameters to the spread level parameter correcting unit 111.

The spread level parameter correcting unit 111 corrects the variance parameter based on the mean parameter and the variance parameter outputted from the pitch model parameter selecting unit 31 and outputs the corrected variance parameter to the feature sequence generating unit 121.

The feature sequence generating unit 121 generates the pitch pattern based on the state durations outputted from the state duration generating unit 21, the mean parameters outputted from the pitch model parameter selecting unit 31, and the variance parameters after the correction outputted from the spread level parameter correcting unit 111.

In this exemplary embodiment, the language processing unit 4, the state duration generating unit 21, the pitch model parameter selecting unit 31, the spread level parameter correcting unit 111 and the feature sequence generating unit 121 are implemented by, for example, an information processing device (e.g., CPU) operating according to a program. The pitch model parameter storage unit 32 is implemented by, for example, a storage device such as a memory or a database system. Incidentally, the processing units (the language processing unit 4, the state duration generating unit 21, the pitch model parameter selecting unit 31, the spread level parameter correcting unit 111 and the feature sequence generating unit 121) may either be implemented by one unit or units separate from one another. It is also possible to employ one or more external devices as the language processing unit 4, the state duration generating unit 21 and the pitch model parameter selecting unit 31, for example. In such cases, each processing unit may acquire necessary information via a network.

Next, the operation of this exemplary embodiment will be described below. FIG. 6 is a flow chart showing an example of the operation of this exemplary embodiment. In the example of FIG. 6, the analysis (morphological analysis, parsing, reading analysis, etc.) of the inputted text (character string information) is executed first by the language processing unit 4. The language processing unit 4 outputs the information representing the "reading" (syllable symbols, phonemic symbols, etc.) and the information representing the parts of speech of morphemes, the conjugations, the accent types, the accent positions, the accentual phrase segmentation, etc. to the state duration generating unit 21 and the pitch model parameter selecting unit 31 as the language information (step S201). Incidentally, the presence/absence of the accent information and the morpheme information and the format of the data are determined depending on the style of implementation of the state duration generating unit 21 and the pitch model parameter selecting unit 31 utilizing the language information.

Subsequently, the state duration generating unit 21 generates the state durations in the HMM based on the language information outputted from the language processing unit 4 (step S202). The state duration generating unit 21 outputs the generated state durations to the feature sequence generating unit 121.

For example, when the number of states is 3 and the durations of the states 1-3 of a phoneme a are d1, d2 and d3, respectively, the duration of the phoneme a is given as d1+d2+d3. The process for determining the durations d1, d2 and d3 in this example is executed by the state duration generating unit 21.

The duration of each state belonging to a phoneme (hereinafter referred to as a "considered phoneme") is determined based on the phonemes existing before and after the considered phoneme (hereinafter referred to as a "preceding phoneme" and a "succeeding phoneme", respectively) and information called "context" such as mora positions in the accentual phrase of the considered phoneme, mora lengths and accent types of accentual phrases to which the preceding/considered/succeeding phonemes belong, and the position of the accentual phrase to which the considered phoneme belongs.

For example, a table storing the correspondence between contexts and state durations, like the one shown in FIG. 7, may be prepared previously. In such cases, the state duration generating unit 21 refers to this table and thereby acquires state durations corresponding to the contexts represented by the language information. The methods described in the Non-patent Literatures 1 to 3 may be employed, for example, as concrete methods for generating the duration of each state. For example, when the method described in the Non-patent Literature 2 is employed, the state duration generating unit 21 may calculate the duration of each state by using the following expression (6) (ρ is assumed to be 0 in this example):

$$d_i = m_i + \rho \cdot \sigma_i^2 \quad \text{Expression (6)}$$

In the expression (6), $m_i$ and $\sigma_i^2$ represent the mean and the variance of the Gaussian distribution regarding a state i, respectively.

The pitch model parameter selecting unit 31 refers to the language information outputted from the language processing unit 4 and thereby acquires pitch model parameters optimum for the language information from the pitch model parameter storage unit 32 (step S203). The pitch model parameter selecting unit 31 outputs the mean parameter included in the acquired pitch model parameters to the spread level parameter correcting unit 111 and the feature sequence generating unit 121. The pitch model parameter selecting unit 31 outputs the variance parameter included in the acquired pitch model parameters to the spread level parameter correcting unit 111.

Specifically, the pitch model parameter selecting unit 31 selects model parameters that are uniquely determined from the language information called "context". For example, the pitch model parameter selecting unit 31 refers to a table associating the contexts with parameters in a one-to-one correspondence, like the one shown in FIG. 8, and thereby reads out a parameter (parameter set) associated with a context represented by the language information. In this case, the model parameter storage unit 32 stores the pitch model parameters in a format like the one shown in FIG. 8. The association between the contexts and the pitch model parameters is made based on classifications such as whether the front end or the rear end of the accentual phrase or whether the accentual phrase is of the 3-mora type 1 or of the 4-mora type 2, for example.

Based on the mean parameter and the variance parameter outputted from the pitch model parameter selecting unit 31, the spread level parameter correcting unit 111 corrects the variance parameter when the variance parameter should be corrected (step S204). The spread level parameter correcting unit 111 outputs the variance parameter after the correction to the feature sequence generating unit 121. The correction of the variance parameter may be executed similarly to the method employed by the spread level parameter correcting unit 11 in the first exemplary embodiment.

The feature sequence generating unit 121 generates the pitch pattern based on the state durations outputted from the state duration generating unit 21, the mean parameters outputted from the pitch model parameter selecting unit 31, and the variance parameters after the correction outputted from the spread level parameter correcting unit 111 (step S205). As the method for generating the pitch pattern, the methods described in the Non-patent Literatures 1 and 2 can be employed, for example.

For example, when the method described in the Non-patent Literature 2 is employed, the feature sequence generating unit 121 calculates the feature sequence (pitch pattern) C by solving the following linear equation (7):

$$W^T U^{-1} W C = W^T U^{-1} M^T \quad \text{Expression (7)}$$

where:
$C = [c_1, c_2, \ldots, c_T]^T$,
$M = [\mu_{q1}', \mu_{q2}', \ldots, \mu_{qT}']^T$,
$U = \text{diag}[U_{q1}, U_{q2}, \ldots, U_{qT}]^T$,
$W = [w_1, w_2, \ldots, w_T]^T$, and
$w_t = [w_t^{(0)}, w_t^{(1)}, w_t^{(2)}] = [1, \Delta, \Delta^2]$ In the above expression, each $c_t$ represents each features to be calculated. $\mu_{qt}'$ and $U_{qt}$ represent the mean parameter and the variance parameter of a state $q_t$, respectively. $[w_t^{(0)}, w_t^{(1)}, w_t^{(2)}]$ represents coefficients of the window function used for determining the static, primary dynamic, and secondary dynamic features. T represents the total number of frames. The states $q_t$ are uniquely determined if the state durations are determined. This is because the state duration represents the number of times of continuation of each state $q_t$. For example, in a case where the state durations of states S1, S2 and S3 are 3 times, 2 times and 4 times, respectively, states $q_t$ (t=1-9) satisfy $q_1$=S1, $q_2$=S1, $q_3$=S1, $q_4$=S2, $q_5$=S2, $q_6$=S3, $q_7$=S3, $q_8$=S3, and $q_9$=S3. The notation "diag [a, b, c]" represents a diagonal matrix having a, b and c as its diagonal elements.

As described above, the feature sequence generating device of this exemplary embodiment calculates the variation of the mean parameter (included in the pitch model parameters as the HMM model parameters representing the information on the pitch frequencies) in the state direction in regard to each state. For states in which the variation is great, the feature sequence generating device carries out the correction of the variance parameter (included in the pitch model parameters) corresponding to the magnitude of the variation. Consequently, the discontinuity of the pitch pattern at parts where the variation of the mean parameter is great is reduced and a pitch pattern having high naturalness and smoothness is generated.

Third Exemplary Embodiment

Figures 8, 9:
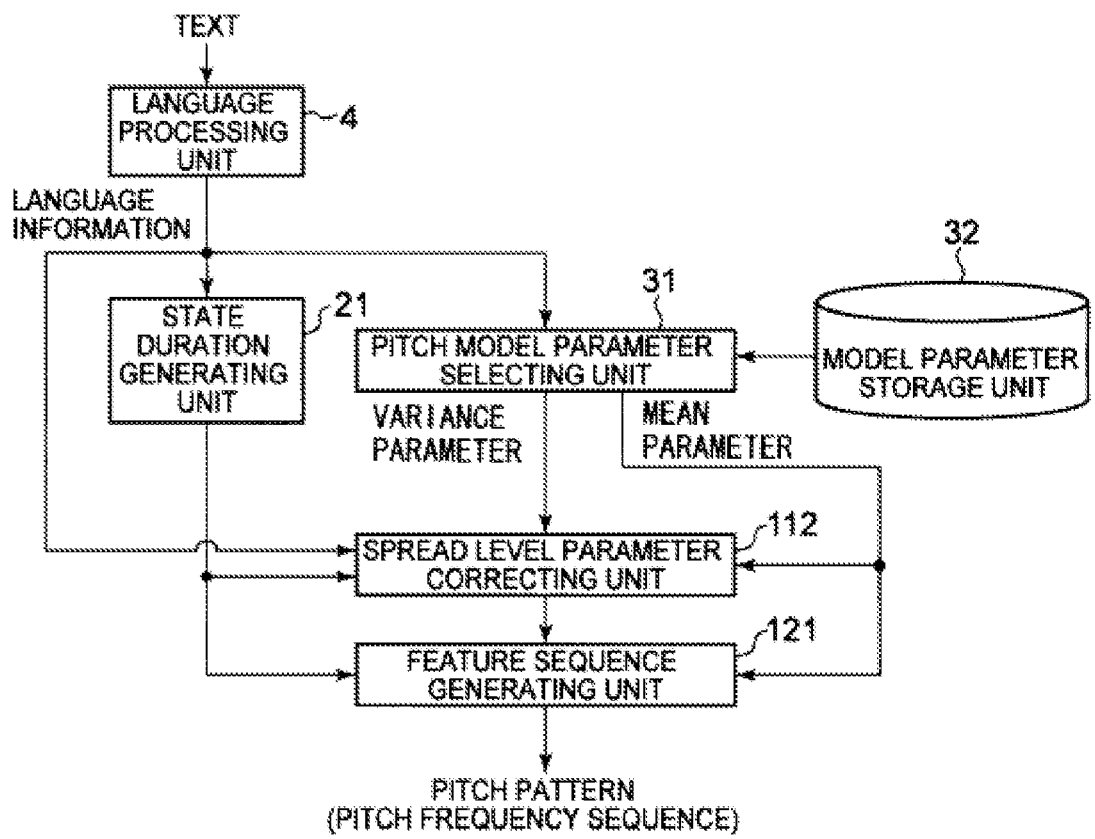
FIG. 8 It depicts an explanatory drawing showing an example of a table storing the correspondence between the contexts and model parameters.
FIG. 9 It depicts a block diagram showing an example of the configuration of a feature sequence generating device in accordance with a third exemplary embodiment.

Next, a third exemplary embodiment of the present invention will be described below. In this exemplary embodiment, the variance parameter correction process is executed by further using the state durations and the language information. FIG. 9 is a block diagram showing an example of the configuration of a feature sequence generating device in accordance with the third exemplary embodiment of the present invention. The feature sequence generating device shown in FIG. 9 comprises a spread level parameter correcting unit 112 instead of the spread level parameter correcting unit 111 in the second exemplary embodiment shown in FIG. 4.

The spread level parameter correcting unit 112 receives the mean parameter and the variance parameter included in the pitch model parameters acquired by the pitch model parameter selecting unit 31. The spread level parameter correcting unit 112 also receives the language information generated by the language processing unit 4. The spread level parameter correcting unit 112 further receives the state duration information generated by the state duration generating unit 21. The spread level parameter correcting unit 112 corrects the variance parameter based on the mean parameter, the variance parameter, the language information and the state duration information inputted thereto.

In this exemplary embodiment, the language processing unit 4 outputs the language information (acquired as the result of the analysis of the inputted text) also to the spread level parameter correcting unit 112. The state duration generating unit 21 outputs the state durations in the HMM (generated based on the language information supplied from the language processing unit 4) also to the spread level parameter correcting unit 112. The pitch model parameter selecting unit 31 outputs the pitch model parameters acquired from the pitch model parameter storage unit 32 (the mean parameter and the variance parameter in this example) also to the spread level parameter correcting unit 112.

The spread level parameter correcting unit 112 calculates the variation of the mean parameter and corrects the variance parameter depending on the magnitude of the variation basically in the same way as the second exemplary embodiment. However, the spread level parameter correcting unit 112 in this exemplary embodiment adjusts and modifies the correction by further using the language information and the state duration information.

Specifically, the spread level parameter correcting unit 112 carries out the correction of the variance parameter preferentially at parts where the state duration is short based on the state duration information. After calculating the variation of the mean parameter, the spread level parameter correcting unit 112 corrects the variation by referring to the state durations. For example, let "$\delta_j$" and "$\delta_{j+1}$" represent the amounts of change of the mean parameter in states j and j+1 and "$d_j$" and "$d_{j+1}$" represent the state durations of the states j and j+1, the spread level parameter correcting unit 112 determines the amounts of change $\delta'_j$ and $\delta'_{j+1}$ after the correction according to the following expression (8) if $d_j > d_{j+1}$ and $\delta_j > \delta_{j+1}$ are satisfied:

$$\delta'_j = 0, \delta'_{j+1} = \delta_j \quad \text{Expression (8)}$$

In order to eliminate the discontinuity of the pitch at the boundary between the state j and the state j+1, the spread level parameter correcting unit 111 in the second exemplary embodiment corrects the variance parameter of the state j. However, the discontinuity at the boundary between the states j and j+1 can be eliminated also by correcting the variance parameter of the state j+1 (instead of the state j). In short, either the variance parameter of the state j or the variance parameter of the state j+1 may be corrected for the elimination of the discontinuity at the boundary between the states j and j+1.

Therefore, in this exemplary embodiment, the variance parameter of one of the states having the shorter state duration is corrected as indicated by the expression (8), that is, the spread level parameter correcting unit 112 increases the amount of correction (correction amount) for one of the states having the shorter state duration. In other words, the spread level parameter correcting unit 112 reduces the correction amount preferentially for parts where the state duration is long. Consequently, the total amount of the correction of variance parameters in the whole pitch pattern can be reduced.

The correction of the variance parameter tends to enhance the fluctuation of the pitch pattern in the correction period and cause irregularity in the pitch pattern of the synthesized speech. However, this exemplary embodiment, correcting the variation of the mean parameter, is capable of further reducing the irregularity in the pitch pattern compared to the second exemplary embodiment.

Further, the spread level parameter correcting unit 112 adjusts the correction of the variance parameter based on the language information. The spread level parameter correcting unit 112 refers to the language information and thereby determines states that need the adjustment of the correction of the variance parameter. For example, the spread level parameter correcting unit 112 acquires information on the phoneme type, whether an accentual phrase boundary is close or not, etc. from the language information and determines states belonging to an aspirated plosive period or close to an accentual phrase boundary, where the pitch tends to change sharply, as the states that need the adjustment of the correction. Subsequently, the spread level parameter correcting unit 112 adjusts the degree of the correction of the variance parameter in regard to the determined states. Specifically, the spread level parameter correcting unit 112 modifies the method for calculating the provisional correction value and the parameters used for the calculation from those used normally. For example, for the states belonging to an aspirated plosive period or close to an accentual phrase boundary where the pitch tends to change sharply, the spread level parameter correcting unit 112 decreases the degree of the correction from the normal level, that is, decreases the correction amount or lowers the criterion for the judgment on whether the correction should be made or not. Thus, the threshold is reduced.

For example, when a linear function like the following expression (9) is used for the calculation of the provisional correction value $\hat{\sigma}_j$, the spread level parameter correcting unit 112 modifies the parameters a and b used for the determined states as explained below. In the expression (9), $\delta_j$ represents the variation in the state j.

$$\hat{\sigma}_j = a \cdot \delta_j + b \qquad \text{Expression (9)}$$

Assuming that $a=a_1$ and $b=b_1$ are the normal parameters, the spread level parameter correcting unit 112 modifies the parameters $a=a_2$ and $b=b_2$ used for the determined states to values satisfying $0<a_2<a_1$ and $0<b_2<b_1$.

The spread level parameter correcting unit 112 may also change the threshold value used for the judgment on whether the provisional correction value should be employed or not. For example, when the spread level parameter $\bar{\sigma}_j$ after the correction is determined by a method like the following expression (10) ($\hat{\sigma}_j$: provisional correction value, $\sigma_j$: variance parameter before the correction), the spread level parameter correcting unit 112 modifies the parameter $\alpha$ used for the determined states as explained below.

$$\bar{\sigma}_j = \begin{cases} \hat{\sigma}_j, & \text{if } |\hat{\sigma}_j - \sigma_j| > \alpha \\ \sigma_j, & \text{if } |\hat{\sigma}_j - \sigma_j| \leq \alpha \end{cases} \qquad \text{Expression (10)}$$

Assuming that $\alpha=\alpha_1$ is the normal parameter, the spread level parameter correcting unit 112 modifies the parameter $\alpha=\alpha_2$ used for the determined states to a value satisfying $\alpha_1<\alpha_2$.

By adjusting the degree of the correction of the variance parameter based on the language information as described above, originally unnecessary parameter correction for the elimination of discontinuity (e.g., reducing the correction amount of the variance parameter in states in which the pitch tends to change sharply) can be avoided. Thus, according to the third exemplary embodiment, the irregularity in the pitch pattern can be reduced further compared to the second exemplary embodiment.

As described above, the feature sequence generating device of this exemplary embodiment is capable of avoiding excessive correction of the variance parameters by using the state duration information and the language information. Consequently, reduction in the irregularity in the pitch pattern is made possible and a pitch pattern having higher naturalness compared to that in the second exemplary embodiment is generated.

Incidentally, the feature sequence generating device may also be configured to allow the user to make a setting regarding whether or not to execute each of the adjustment/modification processes (the adjustment/modification of the correction based on the language information and the adjustment/modification of the correction based on the state duration information) so that each of the processes can be carried out according to selection.

The present invention is not to be restricted to the feature sequence generating devices described in the above exemplary embodiments. The configuration and operation of the feature sequence generating device in accordance with the present invention can be modified properly within the extent not departing from the content of the present invention.

Figure 10:
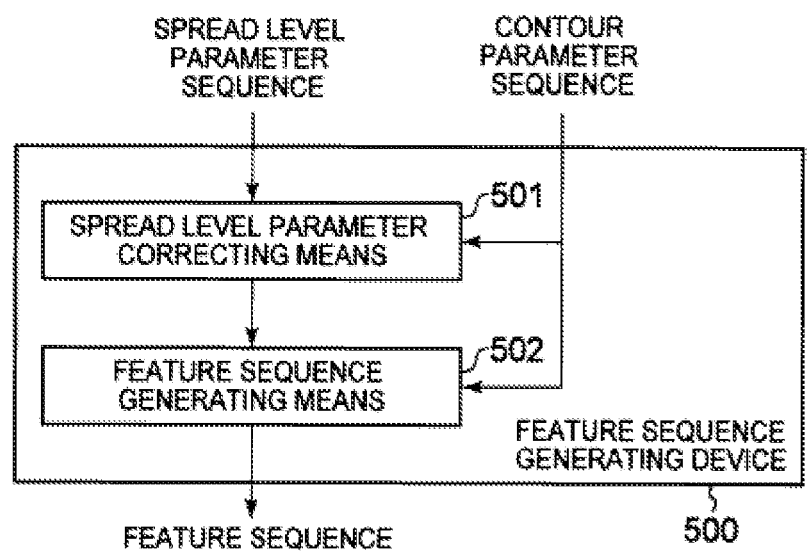
FIG. 10 It depicts a block diagram showing the outline of the feature sequence generating device in accordance with the present invention.

In the following, the outline of the present invention will be described. FIG. 10 is a block diagram showing the outline of the present invention. The feature sequence generating device 500 shown in FIG. 10 receives a contour parameter which represents the contour of a feature sequence of a signal considered as the object of generation and a spread level parameter which represents the level of a spread of the distribution of the features in the feature sequence. The feature sequence generating device 500 comprises spread level parameter correcting means 501 and feature sequence generating means 502.

The spread level parameter correcting means 501 (e.g., the spread level parameter correcting unit 11) corrects the spread level parameter based on the variation of the contour parameter represented by a sequence of the contour parameters inputted thereto.

The feature sequence generating means 502 (e.g., the feature sequence generating unit 12) generates the feature sequence based on the contour parameters inputted thereto and the spread level parameters corrected by the spread level parameter correcting means 501.

The spread level parameter correcting means 501 may correct the spread level parameter so that the value of the spread level parameter at a part corresponding to the position of the contour parameter in the sequence (where the variation is large) increases with the increase in the variation of the contour parameter represented by the sequence of the contour parameters.

The spread level parameter correcting means 501 may determine a provisional correction value of the spread level parameter based on the variation of the contour parameter represented by the sequence of the contour parameters and determine the spread level parameter after the correction based on the determined provisional correction value and the spread level parameter before the correction (original spread level parameter) at a part corresponding to the in-sequence position of the contour parameter with which the provisional correction value was determined.

Further, the spread level parameter correcting means 501 may directly output the inputted spread level parameter as the spread level parameter without making the correction when the difference value between the provisional correction value and the value of the original spread level parameter is less than a prescribed threshold value or when the ratio of the provisional correction value to the value of the original spread level parameter is less than a prescribed threshold value.

Figure 11:
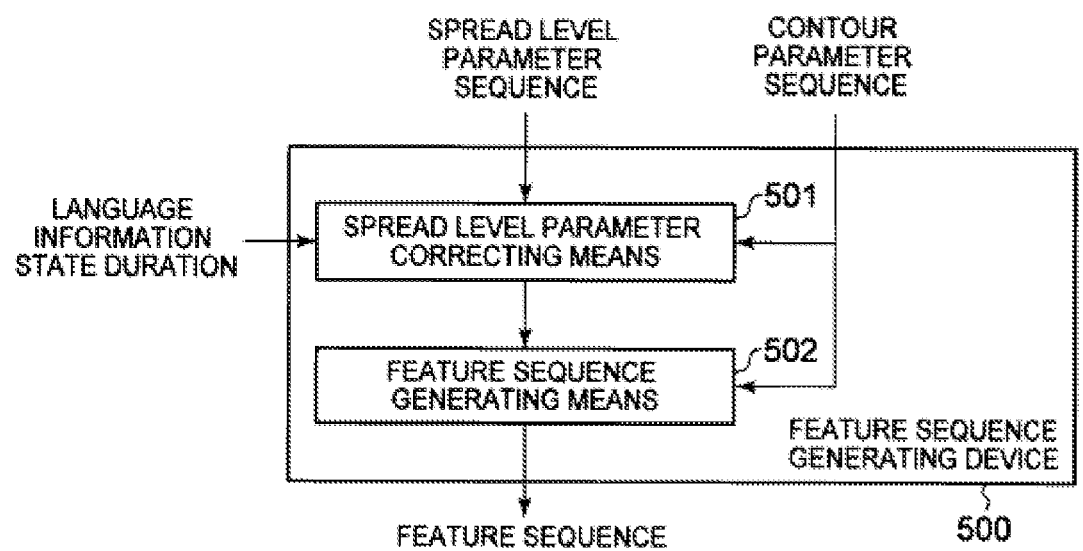
FIG. 11 It depicts a block diagram showing another example of the feature sequence generating device in accordance with the present invention.

FIG. 11 is a block diagram showing another example of the feature sequence generating device 500 in accordance with the present invention. As shown in FIG. 11, the feature sequence generating device 500 may further receive state durations in an HMM (representing the duration of each phoneme) and/or language information on speech and execute a process such as adjustment of the correction amount of the spread level parameter by using the received information.

A parameter included in HMM parameters (acquired by the modeling of information on the features) and representing a statistic selected from a mean, a median, a mode, a maximum value and a minimum value of the output probability distribution may be used as the contour parameter, and a parameter included in the HMM parameters and representing the variance of the output probability distribution may be used as the spread level parameter. In such cases, it is desirable that the spread level parameter correcting means 501 execute the correction preferentially to variance parameters corresponding to short state durations among variance parameters based on state durations in the HMM.

The feature sequence generating device 500 may be configured as a feature sequence generating device that generates a pitch pattern (a sequence of pitch frequencies of speech) as the feature sequence. The contour parameter can be a parameter representing the contour of the pitch pattern. The spread level parameter can be a parameter representing the level of the spread of the distribution of the pitch frequencies. The feature sequence generating device 500 may receive information representing the duration of each phoneme. In such cases, it is desirable that the spread level parameter correcting means 501 execute the correction preferentially to spread level parameters corresponding to short durations among spread level parameters based on the contour parameter and the duration of each phoneme.

The feature sequence generating device 500 may be configured as a feature sequence generating device that generates a pitch pattern (a sequence of pitch frequencies of speech) as the feature sequence. The contour parameter can be a parameter representing the contour of the pitch pattern. The spread level parameter can be a parameter representing the level of the spread of the distribution of the pitch frequencies. The feature sequence generating device 500 may receive information representing the duration of each phoneme. In such cases, the spread level parameter correcting means 501 may set the degree of the correction of the spread level parameter lower in parts where the pitch tends to change sharply in comparison with the degrees in the other parts based on the language information on the speech.

While the present invention has been described above with reference to the exemplary embodiments and examples, the present invention is not to be restricted to the particular illustrative exemplary embodiments and examples. A variety of modifications understandable to those skilled in the art can be made to the configuration and details of the present invention within the scope of the present invention.

This application claims priority to Japanese Patent Application No. 2010-249604 filed on Nov. 8, 2010, the entire disclosure of which is incorporated herein by reference.

INDUSTRIAL APPLICABILITY

The present invention is suitably applicable not only to devices for the purpose of generating feature sequences of signals but also to devices needing the contour parameters and the spread level parameters for evaluating or adjusting already-existing feature sequences, etc.

REFERENCE SIGNS LIST

4 Language processing unit
11, 111, 112 Spread level parameter correcting unit
12, 121 Feature sequence generating unit
21 State duration generating unit
31 Pitch model parameter selecting unit
32 Pitch model parameter storage unit

What is claimed is:

1. A feature sequence generating device including a processor, comprising:
   a spread level parameter correcting unit, implemented by the processor, which corrects a spread level parameter which represents a level of a spread of distribution of features in a feature sequence of the speech signal features based on a contour parameter variation represented by a sequence of contour parameters which represent the contour of the feature sequence respectively; and
   a feature sequence generating unit, implemented by the processor, which generates the feature sequence based on the contour parameter and the spread level parameter corrected by the spread level parameter correcting unit.

2. The feature sequence generating device according to claim 1, wherein the spread level parameter correcting unit corrects the spread level parameter so that a value of the spread level parameter increases with increase in the contour parameter variation.

3. The feature sequence generating device according to claim 1, wherein the spread level parameter correcting unit determines a provisional correction value based on the contour parameter variation and determines a corrected spread level parameter based on the original spread level parameter and the provisional correction value.

4. The feature sequence generating device according to claim 3, wherein the spread level parameter correcting unit outputs a not corrected spread level parameter when a difference value between the provisional correction value and a value of the original spread level parameter is less than a prescribed threshold value or when a ratio of the provisional correction value to the value of the original spread level parameter is less than a prescribed threshold value.

5. The feature sequence generating device according to claim 1, wherein:

the contour parameter is a parameter included in HMM parameters acquired by the modeling of information on features and representing a statistic selected from a mean, a median, a mode, a maximum value and a minimum value of output probability distribution, and the spread level parameter is a variance parameter included in the HMM parameters and representing variance of the output probability distribution, and the spread level parameter correcting unit corrects preferentially the variance parameter corresponding to short state duration among variance parameters based on state duration in the HMM.

6. The feature sequence generating device according to claim 1, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit corrects preferentially the spread level parameter corresponding to short duration among spread level parameters based on the contour parameter and duration of each phoneme.

7. The feature sequence generating device according to claim 1, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit sets degree of correction of the spread level parameter lower in parts where the pitch tends to change sharply in comparison with the degrees in the other parts based on language information on the speech.

8. A non-transitory computer readable information recording medium storing a feature sequence generating program for causing a computer to execute:

a process of correcting a spread level parameter representing a level of a spread of distribution of features in a feature sequence of the speech signal features based on a contour parameter variation represented by a sequence of contour parameters which represent the contour of the feature sequence, respectively; and a process of generating the feature sequence based on the contour parameter and corrected spread level parameter.

9. The feature sequence generating device according to claim 2, wherein the spread level parameter correcting unit determines a provisional correction value based on the contour parameter variation and determines a corrected spread level parameter based on the original spread level parameter and the provisional correction value.

10. The feature sequence generating device according to claim 2, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit corrects preferentially the spread level parameter corresponding to short duration among spread level parameters based on the contour parameter and duration of each phoneme.

11. The feature sequence generating device according to claim 3, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit corrects preferentially the spread level parameter corresponding to short duration among spread level parameters based on the contour parameter and duration of each phoneme.

12. The feature sequence generating device according to claim 4, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit corrects preferentially the spread level parameter corresponding to short duration among spread level parameters based on the contour parameter and duration of each phoneme.

13. The feature sequence generating device according to claim 5, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit corrects preferentially the spread level parameter corresponding to short duration among spread level parameters based on the contour parameter and duration of each phoneme.

14. The feature sequence generating device according to claim 2, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit sets degree of correction of the spread level parameter lower in parts where the pitch tends to change sharply in comparison with the degrees in the other parts based on language information on the speech.

15. The feature sequence generating device according to claim 3, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit sets degree of correction of the spread level parameter lower in parts where the pitch tends to change sharply in comparison with the degrees in the other parts based on language information on the speech.

16. The feature sequence generating device according to claim 4, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit sets degree of correction of the spread level parameter lower in parts where the pitch tends to change sharply in comparison with the degrees in the other parts based on language information on the speech.

17. The feature sequence generating device according to claim 5, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit sets degree of correction of the spread level parameter lower in parts where the pitch tends to change sharply in comparison with the degrees in the other parts based on language information on the speech.

18. The feature sequence generating device according to claim 6, wherein:

the feature sequence generating device generates a pitch pattern, formed as a sequence of pitch frequencies of speech, as the feature sequence, and the contour parameter represents a contour of the pitch pattern and the spread level parameter represents a level of a spread of distribution of the pitch frequencies, and the spread level parameter correcting unit sets degree of correction of the spread level parameter lower in parts where the pitch tends to change sharply in comparison with the degrees in the other parts based on language information on the speech.

* * * * *